US008965641B2

(12) United States Patent
Smith et al.

(10) Patent No.: US 8,965,641 B2
(45) Date of Patent: Feb. 24, 2015

(54) POSITIONING SYSTEM USING RADIO FREQUENCY SIGNALS

(71) Applicant: Caterpillar Inc., Peoria, IL (US)

(72) Inventors: David William Smith, Upper Coomera (AU); Richard Kent Yates, Bardon (AU)

(73) Assignee: Caterpillar Inc., Peoria, IL (US)

( * ) Notice: Subject to any disclaimer, the term of this patent is extended or adjusted under 35 U.S.C. 154(b) by 70 days.

(21) Appl. No.: 13/722,179

(22) Filed: Dec. 20, 2012

(65) Prior Publication Data

US 2014/0081531 A1  Mar. 20, 2014

Related U.S. Application Data

(60) Provisional application No. 61/703,125, filed on Sep. 19, 2012, provisional application No. 61/704,202, filed on Sep. 21, 2012.

(51) Int. Cl.
| | |
|---|---|
| G05D 1/02 | (2006.01) |
| G01C 21/30 | (2006.01) |
| G01S 17/06 | (2006.01) |
| G01S 17/42 | (2006.01) |
| G01S 17/89 | (2006.01) |
| G01S 13/74 | (2006.01) |
| G01S 13/86 | (2006.01) |
| G01S 1/68 | (2006.01) |
| G01S 5/02 | (2010.01) |
| G01S 7/48 | (2006.01) |
| G01S 17/87 | (2006.01) |

(52) U.S. Cl.
CPC .............. *G05D 1/024* (2013.01); *G01S 17/06* (2013.01); *G01C 21/30* (2013.01); *G01S 17/42* (2013.01); *G01S 17/89* (2013.01); *G01S 13/74* (2013.01); *G01S 13/865* (2013.01); *G01S 1/68* (2013.01); *G01S 5/0257* (2013.01); *G01S 5/0294* (2013.01); *G01S 7/4808* (2013.01); *G05D 1/0261* (2013.01); *G05D 1/0274* (2013.01); *G01S 17/87* (2013.01); *G05D 2201/021* (2013.01)
USPC ............................ 701/50; 701/446; 356/4.01

(58) Field of Classification Search
USPC ........ 701/50, 446, 23–25; 324/635; 356/4.01; 73/861.27
See application file for complete search history.

(56) References Cited

U.S. PATENT DOCUMENTS

| | | | |
|---|---|---|---|
| 6,694,233 B1 | 2/2004 | Duff et al. | |
| 7,363,125 B2 * | 4/2008 | Hashimoto et al. | ............. 701/23 |

(Continued)

FOREIGN PATENT DOCUMENTS

AU  779583  2/2001

*Primary Examiner* — Marthe Marc-Coleman
(74) *Attorney, Agent, or Firm* — Finnegan, Henderson, Farabow, Garrett & Dunner, LLP

(57) ABSTRACT

A positioning system and method for determining a position of a machine are disclosed. The system may have an optical sensing device configured to generate determined shape data associated with a portion of the worksite at the position of the machine. The system may have a first signal device configured to transmit a radio frequency signal and receive a response signal. The system may have a second signal configured to receive the transmitted radio frequency signal and transmit the response signal. The system may have a controller in communication with the optical sensing device and at least one of the first and second signal devices. The controller may be configured to determine an approximate position based on the radio frequency signal and the response signal, identify a reference shape data corresponding to the determined shape data, and determine the position based on the approximate position and the reference shape data.

11 Claims, 9 Drawing Sheets

(56) References Cited

U.S. PATENT DOCUMENTS

| | | | |
|---|---|---|---|
| 8,676,429 B2* | 3/2014 | Nakano et al. | 701/25 |
| 2002/0130806 A1 | 9/2002 | Taylor, Jr. et al. | |
| 2006/0259213 A1* | 11/2006 | Hashimoto et al. | 701/23 |
| 2009/0021351 A1 | 1/2009 | Beniyama et al. | |
| 2009/0262604 A1* | 10/2009 | Funada | 367/127 |
| 2010/0134276 A1 | 6/2010 | Zaruba et al. | |
| 2010/0295943 A1 | 11/2010 | Cha et al. | |

* cited by examiner

POSITIONING SYSTEM USING RADIO FREQUENCY SIGNALS

CROSS-REFERENCE TO RELATED APPLICATIONS

This application claims the benefit of U.S. Provisional Application No. 61/703,125, filed Sep. 19, 2012, and U.S. Provisional Application No. 61/704,202, filed Sep. 21, 2012. The entire disclosure of each of these provisional applications is incorporated herein by reference.

TECHNICAL FIELD

The present disclosure relates generally to a positioning system and, more particularly, to a positioning system for a mobile machine that provides high-precision position determination in underground environments.

BACKGROUND

Machines such as, for example, haul trucks, drills, loaders, conveyors, and other types of heavy equipment are commonly used in underground mining applications to perform a variety of tasks. Unlike above-ground mining applications, underground mining sites do not have access to GPS (Global Positioning System) signals, yet knowledge of a machine's on-site location is desirable, for example, with respect to the site geography.

In some underground mining applications, Light Detection and Ranging (LIDAR) positioning systems may be used to determine the location of a machine with respect to a worksite. LIDAR systems scan the surrounding environment to identify shapes of portions of the worksite in proximity of the machine. The scanned shapes are then compared to a known map of the worksite, and the positioning system infers the position of the machine based on a correlation between the location on the map and the scanned shape.

In some applications, however, it may be difficult for LIDAR systems to determine the location of a machine based solely on the identification of shapes. For instance, the LIDAR systems may detect shapes that are not unique to a specific location, and without additional information about the general location of the machine, it may not be possible to deduce the specific location of the machine based solely on the scanned shape. In addition, there may be objects at the worksite that do not have a permanent location or that have been newly added. Such objects may cause complications for LIDAR systems that are trying to match the shapes in the worksite environment to a pre-existing map if those shapes are not included in the pre-existing map.

The disclosed positioning system is directed to overcoming one or more of the problems set forth above and/or other problems of the prior art.

SUMMARY

In one aspect, the present disclosure is directed to a system for determining a position of a machine in a worksite. The system may include an optical sensing device configured to generate determined shape data associated with a portion of the worksite at the position of the machine. The system may also include a first signal device configured to transmit a radio frequency signal and receive a response signal, and a second signal device configured to receive the transmitted radio frequency signal and transmit the response signal in response to receiving the radio frequency signal. The system may also include a controller in communication with the optical sensing device and at least one of the first and second signal devices. The controller may be configured to determine an approximate position of the machine based on the radio frequency signal and the response signal. The controller may also be configured to identify at least one reference shape data corresponding to the determined shape data. The controller may also determine the position of the machine based on the approximate position and a position in the worksite associated with the at least one reference shape data.

In another aspect, the present disclosure is directed to a method for determining a position of a machine at a worksite. The method may include generating determined shape data associated with a portion of the worksite. The method may include transmitting a radio frequency signal, receiving the radio frequency signal, and transmitting a response signal in response to receiving the radio frequency signal. The method may include determining an approximate position of the machine based on the response signal and an elapsed time associated with the radio frequency signal and the response signal. The method may include identifying at least one reference shape data corresponding to the determined shape data. The method may also include determining the position of the machine based on the approximate position and a position in the worksite associated with at least one reference shape data.

In yet another aspect, the present disclosure is directed to a system for determining a position of a machine at a worksite. The system may include a first signal device configured to transmit one or more radio frequency signals and receive one or more response signals. The system may include a second signal device configured to receive the one or more transmitted radio frequency signals and transmit the one or more response signals in response to receiving the one or more radio frequency signals. The first signal device may be located on one of the machine and at a fixed location within the worksite, and the second signal device is located at the other of on the machine and the fixed location within the worksite. The system may include a movement sensor configured to detect movement of the machine. The system may also include a controller, wherein the controller may be configured to generate a plurality of first sets of particles and second sets of particles in a closed-loop manner. The controller may generate a first set of particles, each particle being associated with a position within the worksite and an orientation. The controller may update the position and orientation of each particle of the first set of particles based on the detected movement of the machine. The controller may assign a weight to each particle of the first set of particles indicative of a probability that the position and orientation of the particle match the position and an orientation of the machine, wherein the probability is determined based on elapsed time between transmitting the one or more radio frequency signals and receiving the one or more response signals. The controller may generate a second set of particles based on the assigned weights. The controller may determine the position of the machine based on one of the plurality of second sets of particles.

In another aspect, the present disclosure is directed to a method for determining a position of a machine in a worksite. The method may include transmitting one or more radio frequency signals. The method may also include receiving the one or more radio frequency signals and transmitting one or more response signals in response to receiving the one or more radio frequency signals. The method may include receiving the one or more response signals. The method may include generating a plurality of first sets of particles and second sets of particles, in closed loop manner. The method may include generating a first set of particles, each particle being associated with a position within the worksite and an orientation. The method may include updating the position and orientation of each particle of the first set of particles based on detected movement of the machine. The method may include assigning a weight to each particle of the first set of particles indicative of the probability that the position and orientation of the particle match the position and an orientation of the machine, wherein the probability is determined based on elapsed times between transmission of the one or more radio frequency signals and reception of the one or more response signals. The method may include generating a second set of particles based on the assigned weights. The method may include determining the position of the machine based on one of the plurality of second sets of particles.

In yet another aspect, the present disclosure is directed to a load-haul-dump loader in a worksite. The loader may include a power system, one or more traction devices driven by the power system to move the load-haul-dump loader, and a positioning system to determine the position of the load-haul-dump loader. The positioning system may include a first signal device, a second signal device, a movement sensor, and a controller. The controller may be configured to generate a plurality of first sets of particles and second sets of particles in a closed-loop manner. The controller may generate a first set of particles, each particle being associated with a position within the worksite and an orientation. The controller may update the position and orientation of each particle of the first set of particles based on detected movement of the load-haul-dump loader. The controller may assign a weight to each particle of the first set of particles indicative of the probability that the position and orientation of the particle match the position and an orientation of the load-haul-dump loader, wherein the probability is determined based on elapsed time between transmitting one or more frequency signals by the first signal device and receiving the one or more response signals by the second signal device. The controller may generate a second set of particles by utilizing the assigned weights. The controller may determine the position of the load-haul-dump loader based on one of the plurality of second sets of particles.

DETAILED DESCRIPTION

Figure 1:
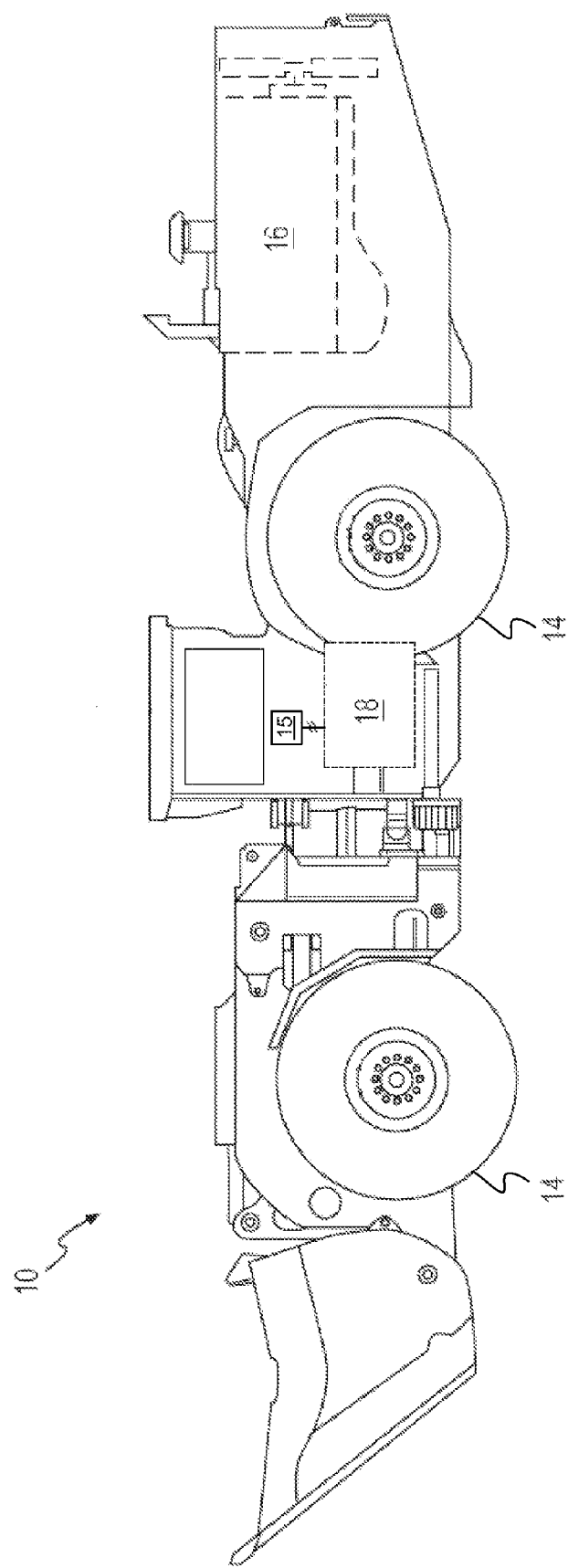
FIG. 1 is a pictorial illustration of an exemplary disclosed machine.

FIG. 1 illustrates a machine 10 having an exemplary disclosed positioning system. Machine 10 embodies a mobile machine configured to perform one or more operations associated with an industry such as mining, construction, farming, transportation, or any other industry known in the art. For example, machine 10 may be a load-moving machine such as a haul truck, a loader, an excavator, a wheel tractor, a scraper, or any other like machine. Machine 10 may be used above-ground or underground. For example, FIG. 1 illustrates an underground mining load-haul-dump (LHD) loader, which may be used to access a load site in a mine, haul a load away from the load site, and release the load at a dump site. Machine 10 may be manually controlled, semi-autonomously controlled, or fully-autonomously controlled. Machine 10 may include, among other things, one or more traction devices 14 that propel machine 10, movement sensors 15 that sense various movements of machine 10, a power source 16, and a controller 18. Controller 18 may be in communication with movement sensors 15, power source 16, and/or drive traction devices 14, and may be configured to regulate operation of power source 16 in response to various inputs, for example, from an operator input device and/or movement sensors 15, to drive traction devices 14 and propel machine 10 in a desired manner. Controller 18 may also receive information from movement sensors 15 indicative of, for example, velocity, acceleration, and/or turning rate of machine 10, and may be configured to compute various motions, such as distance and direction traversed by machine 10, based on such information. In various embodiments, controller 18 may also be utilized in determining the position of machine 10 as will be described in greater detail below.

Figure 2:
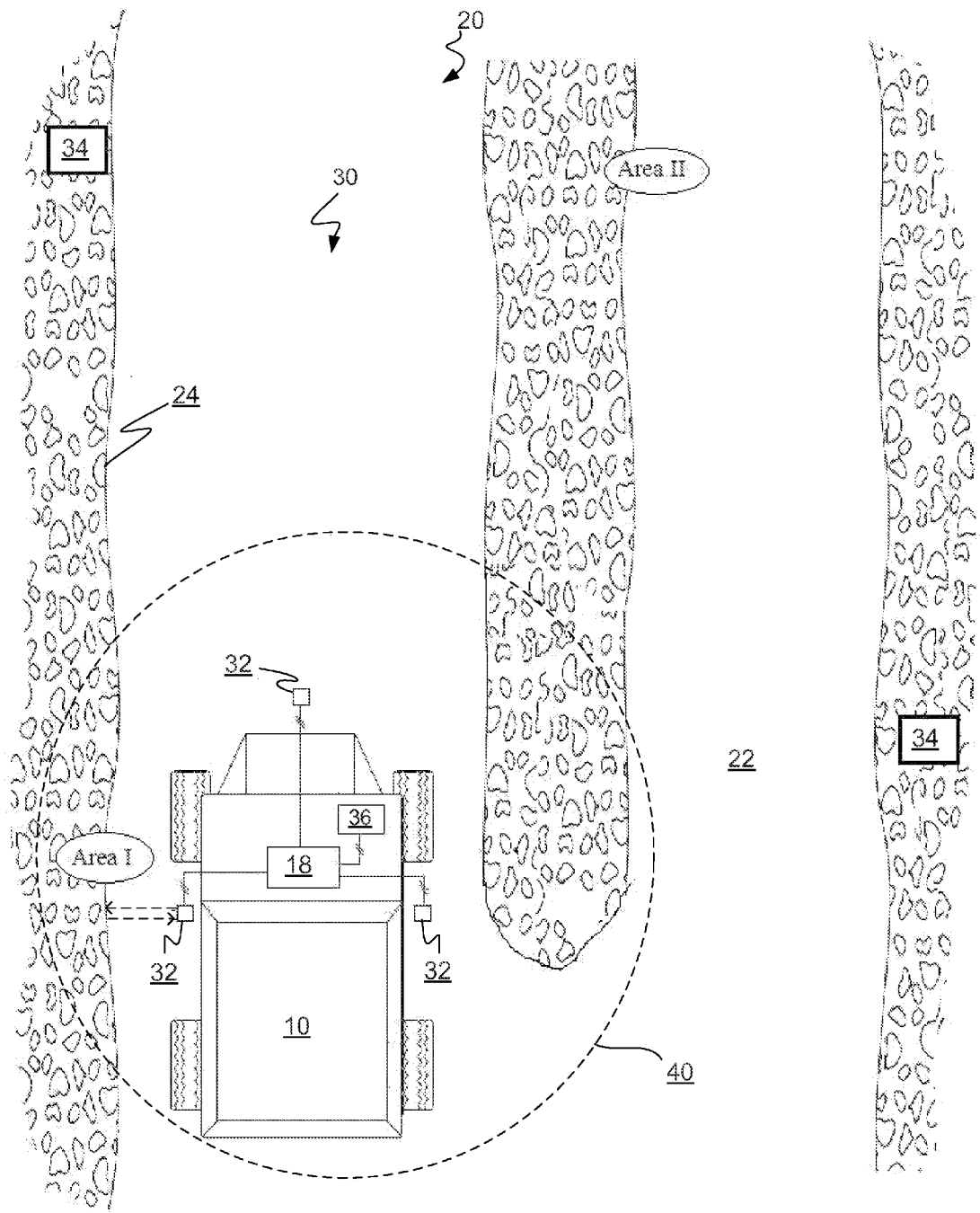
FIG. 2 is a pictorial illustration of an exemplary positioning system that may be used with the machine of FIG. 1.

FIG. 2 illustrates machine 10 performing a task at a worksite 20. Worksite 20 may be a mine site or any other type of worksite having a roadway 22 traversable by machine 10. In some embodiments, worksite 20 may not have access to GPS navigation systems, for example, when worksite 20 is an underground mine site. Roadway 22 may be bordered by side walls 24, such as, for example, walls of an underground tunnel, and may have a ceiling, such as a tunnel roof disposed above roadway 22. In some applications, there may also be objects other than side walls 24 such as other machines, barrels, poles, geological features, and other like obstacles disposed in various locations at worksite 20 relative to roadway and/or the additional objects described above. In various embodiments, it may be desirable to ascertain position information of machine 10 in worksite 20. In some embodiments, the position information may be used by machine 10 in navigating worksite 20. In other embodiments, the position information may be used to monitor and gather data about how efficiently machine 10 and other machines in worksite 20 are performing various tasks.

In exemplary embodiments, a position of machine 10 in worksite 20 may be determined by utilizing a positioning system 30. As illustrated in FIG. 2, positioning system 30 may include, among other things, controller 18, an optical sensing device 32, a reader device 34, and/or a tag device 36. Controller 18 may include a processor, a memory module, and/or a storage module (not shown). In some embodiments, one or more of the processor, memory module, and/or storage module may be included together in a single apparatus. In other embodiments, one or more of the processor, memory module, and/or storage module may be provided separately. Processor may include one or more known processing devices, such as a microprocessor. Memory module may include one or more devices, such as random-access memory (RAM), configured to store information used dynamically by controller 18 to perform functions related to the various operations of machine 10. Storage module may include any type of storage device or computer readable medium known in the art. For example, storage module may comprise a magnetic, semiconductor, tape, optical, removable, non-removable, volatile, and/or non-volatile storage device. Storage module may store programs, algorithms, maps, look-up tables, and/or other information associated with determining a position of machine 10 in worksite 20.

Optical sensing device 32 may be utilized to scan objects surrounding machine 10, such as roadway 22, side walls 24, the ceiling of an underground tunnel, and/or any other object associated with worksite 20, using light signals. Optical sensing device 32 may be located on a frame and/or body of machine 10, such as at the front, back, side, and/or any other place on machine 10. There may be more than one optical sensing device 32 disposed on machine 10, and each optical sensing device 32 may be located at a unique location on machine 10. For example, separate optical sensing devices 32 may be located at the front, at the back, and on each side of machine 10. In various embodiments, an exemplary optical sensing device 32 may be a LIDAR unit that includes one or more light sources, such as lasers, and/or one or more detectors. In other embodiments, an exemplary optical sensing device 32 may be any other device known in the art that utilizes optical electromagnetic radiation to obtain information related to roadway 22, side walls 24, the ceiling, and/or any other object associated with worksite 20. In exemplary embodiments in which optical sensing device 32 comprises a LIDAR unit, lasers may emit light that reflects off of, for example, the surface of side walls 24 and/or other surfaces of objects in worksite 20. Detectors of the LIDAR unit may receive the reflected light and may send signals to controller 18 indicative of the light received. Controller 18 may then calculate distances to the various points on the surfaces of the objects based on data from optical sensing device 32. For example, such data may include time elapsed between emission of the light and detection of the light. Based on the calculated distances, controller 18 may also estimate, calculate, and/or otherwise determine a shape of the object. In this disclosure, the shape of the object determined based on the data from optical sensing unit 32 is referred to as "determined shape data."

In some embodiments, positioning system 30 may include a map of worksite 20 stored in the storage module of controller 18. In such embodiments, controller 18 may compare the determined shape data to stored and/or otherwise known shapes disposed at unique respective locations on the map of worksite 20. In this disclosure, these stored and/or otherwise known shapes of the map of worksite 20 are referred to as "reference shape data." In exemplary embodiments, controller 18 may compare length, width, height, dimensional, angular, orientation, and/or other information indicated by determined shape data with stored information associated with each respective reference shape data. Controller 18 may identify a best match between the determined shape data and a reference shape data. Since each reference shape data corresponds to a unique location at worksite 20, controller 18 may determine a position of machine 10 based on this corresponding location.

In various embodiments, such as, for example, when worksite 20 includes similar features in various locations or consists of a repeating layout, controller 18 may have difficulty finding a unique match between the determined shape data and reference shape data. In such embodiments, controller 18 may not be able to determine the position of machine 10 with certainty and/or great accuracy. For example, as shown, in FIG. 2, side walls 24 at Area I and Area II may each have substantially similar shapes. Machine 10 may be near Area I and may scan side wall 24 of Area I with optical sensing device 32. However, the determined shape data obtained by the controller 18 in response to the scan may closely match two different reference shape data that correspond to the side wall surface shapes located at Area I and Area II. In such situations, controller 18 may not be able to ascertain whether machine 10 is at the location of Area I or Area II. Thus, in such embodiments, reader device 34 and tag device 36 may be utilized, in addition to optical sensing device 32, in determining the position of machine 10.

Reader device 34 and/or tag device 36 may be devices configured to generate, transmit, and/or receive signals. In some embodiments, the signals generated, transmitted, and/or received by reader device 34 and/or tag device 36 may be radio frequency signals. For example, reader device 34 may be an RFID (Radio Frequency Identification) reader and tag device 36 may be an active RFID tag, where an RFID tag that is active (as opposed to passive) may actively generate signals without first receiving a signal. Both reader device 34 and tag device 36 may include a transmitter that transmits radio frequency signals, a receiver that receives radio frequency signals, and/or a transceiver that both transmits and receives radio frequency signals. In some embodiments, tag device 36 may be placed on machine 10 and reader device 34 may be placed at a point in worksite 20 such as, for example on or in side walls 24 or a ceiling of an underground tunnel of worksite 20. In some embodiments, there may be more than one tag device 36 disposed on machine 10, and each tag device 36 may be located at a unique location on machine 10. For example, separate tag devices 36 may be located at the front and at the back of machine 10. In some embodiments, more than one reader device 34 may be placed at various points of worksite 20. In some embodiments, reader devices 34 and tag devices 36 may be interchanged such that one or more reader devices 34 may be attached to machine 10 and one or more tag devices 36 may be attached to various points of worksite 20.

In some embodiments, tag device 36 may generate and transmit a radio frequency signal, and reader device 34 may receive the radio frequency signal generated by tag device 36. In response to receiving the radio frequency signal, reader device 34 may generate and transmit a response signal, and tag device 36 may receive the response signal. Positioning system 30 may then determine the distance between reader device 34 and tag device 36 based on the time elapsed between transmission of the radio frequency signal by tag device 36 and reception of the response signal by tag device 36. In some embodiments, tag device 36 may calculate the distance, for example, using a processor located within and/or associated with tag device 36. In some embodiments, tag device 36 may store the calculated distance, for example, in a memory located within and/or associated with tag device 36. For example, in FIG. 2, the processor and storage module of controller 18 of positioning system 30 may calculate and store the distances between reader device 34 and tag device 36. In some embodiments, these stored distances may be used by controller 18 to determine the position of machine 10. Embodiments in which the position of machine 10 in worksite 20 may be determined by utilizing reader device 34 and tag device 36 will be described in greater detail below with respect to FIGS. 5 and 6.

In some embodiments, when positioning system 30 includes multiple reader devices 34, tag device 36 may transmit a radio frequency signal, and one or more of the multiple reader devices 34 may be in range to receive the radio frequency signal and may, in turn, transmit a response signal. The radio frequency signal from tag device 36 and the response signal from each reader device 34 may include information that uniquely identifies from which tag device 36 the radio frequency signal originated, and from which reader device 34 the response signal originated. Therefore, tag device 36 may receive multiple response signals and calculate multiple distances, each distance corresponding to a unique reader device 34 from the multiple reader devices 34 that transmitted a response signal. In some embodiments, controller 18 may calculate and/or store one or more of the multiple distances. In further embodiments, tag device 36 may store one or more of the calculated distances.

In other embodiments, the roles of reader device 34 and tag device 36 may be switched such that a reader device 34 may generate and transmit a radio frequency signal, tag device 36 may receive the radio frequency signal and transmit a response signal, and reader device 34 may receive the response signal. The distance between tag device 36 and reader device 34 may be determined based on the time elapsed between transmission of the radio frequency signal and the reception of the response signal by reader device 34. In some embodiments, reader device 34 may calculate and store the one or more distances. In other embodiments, a processor and storage device associated with reader device 34 may calculate and store the one or more distances.

For purposes of the present disclosure, reader devices 34 and tag devices 36 may be interchangeable. To reflect this flexibility, reader device 34 and tag device 36 may also be referred to throughout the present disclosure as "first signal device" and "second signal device," not necessarily respectively. That is, first signal device may be reader device 34 and second signal device may be tag device 36, or first signal device may be tag device 36 and second signal device may be reader device 34. In exemplary embodiments, an initial signal from a first signal device may be received by a second signal device. In response to receiving the initial signal from the first signal device, the second signal device may generate a response signal. The first signal device that generated the initial signal may receive the response signal, such that a distance may be determined between the two devices. In various embodiments, the first signal device may be located on machine 10, and the second signal device may be located at a fixed point in worksite 20. In other embodiments, the first signal device may be located at a fixed point in worksite 20, and the second signal device may be located on machine 10.

For example, tag device 36 may be an active RFID tag, and reader device 34 may be an RFID reader. Multiple tag devices 36 may be mounted at various fixed locations of worksite 20, and reader device 34 may be attached to machine 10. Tag devices 36 may be configured to initiate the distance measurement, for example, by transmitting a radio frequency signal to reader device 34, receiving a response signal from reader device 34, and measuring the time elapsed between transmitting the radio frequency signal and receiving the response signal. In some embodiments, tag device 36 may initiate the distance measurement with all reader devices 34 attached to one or more machine 10 in worksite 20 at the same time. In some embodiments, reader device 34 on machine 10 can retrieve the distance measurements from tag devices 36 at any time. In various embodiments, reader device 34 may then transmit the retrieved distance measurements to controller 18 for performing methods of determining position as discussed with respect to FIGS. 5, 6, and 7 below.

In another exemplary embodiment, tag device 36 may be an active RFID tag mounted at various fixed locations of worksite 20, and reader device 34 may be attached to machine 10, but reader device 34 may be configured to initiate the distance measurement and determine the distance, for example, by transmitting a radio frequency signal to tag device 36, receiving a response signal from tag device 36, and measure the time elapsed between transmitting the radio frequency signal. In some embodiments, reader device 34 may then transmit the measurement of elapsed time to controller 18 for performing methods of determining position as discussed below.

In yet another exemplary embodiment, tag device 36 may be an active RFID tag attached to machine 10, and reader device 34 may be an RFID reader 34 mounted at various fixed locations of worksite 20, as depicted in FIGS. 2, 3, 4, 8, 9, and 10. Tag devices 36 may be configured to initiate the distance measurement, for example, by transmitting a radio frequency signal to reader device 34, receiving a response signal from reader device 34, and measuring the time elapsed between transmitting the radio frequency signal and receiving the response signal. In some embodiments, tag device 36 may then transmit the measurement of elapsed time to controller 18 for performing methods of determining position as discussed below.

In the embodiment illustrated in FIG. 2, positioning system 30 includes multiple reader devices 34. Tag device 36 may receive response signals from each of the multiple reader devices 34, and may determine the distance to each reader device 34 based on the received response signals corresponding to each reader device 34. Controller 18 may then use the distances to the multiple reader devices 34 to narrow down the possibilities of where machine 10 may be located in worksite 20 by processes known in the art. Such process may include, for example, trilateration. In the trilateration process, known distances between an object of interest and two or more fixed points are used as radii of circles associated with the respective fixed points. The location where the circles intersect may be utilized as the position of the object of interest. In some embodiments, due to noise or error in the distances measured, the position determined through trilateration may be an approximate position 40. For example, such error may be caused by electrical noise in tag device 36 and/or reader device 34 and/or interference with the radio frequency signals of tag device 36 and/or reader device 34 by other devices that are emitting signals in the radio frequency range. In addition, such error may be caused by reflection and/or absorption of the radio frequency signals by objects in worksite 20. As shown in FIG. 2, approximate position 40 may comprise a range of possible positions of machine 10, as opposed to a specific position of machine 10. Positioning system 30 may utilize approximate position 40 in conjunction with the determined shapes obtained by optical sensing device 32 to determine a specific position of machine 10. For example, as shown in FIG. 2, based on the distance between tag device 36 on machine 10 and reader devices 34 in worksite 20, positioning system 30 may determine an approximate position 40 in the vicinity of Area I. Therefore, positioning system 30 may determine that it is likely machine 10 is near Area I, and not near Area II, of worksite 20 even though a determined shape obtained by optical unit 32 may match the shape of the side wall 24 at both Area I and at Area II. In exemplary embodiments, positioning system 30 may use determined shape data from optical unit 32 to specifically pinpoint where in the approximate position 40 of Area I machine 10, once approximate position 40 has been determined using reader device 34 and tag device 36.

Figure 3:
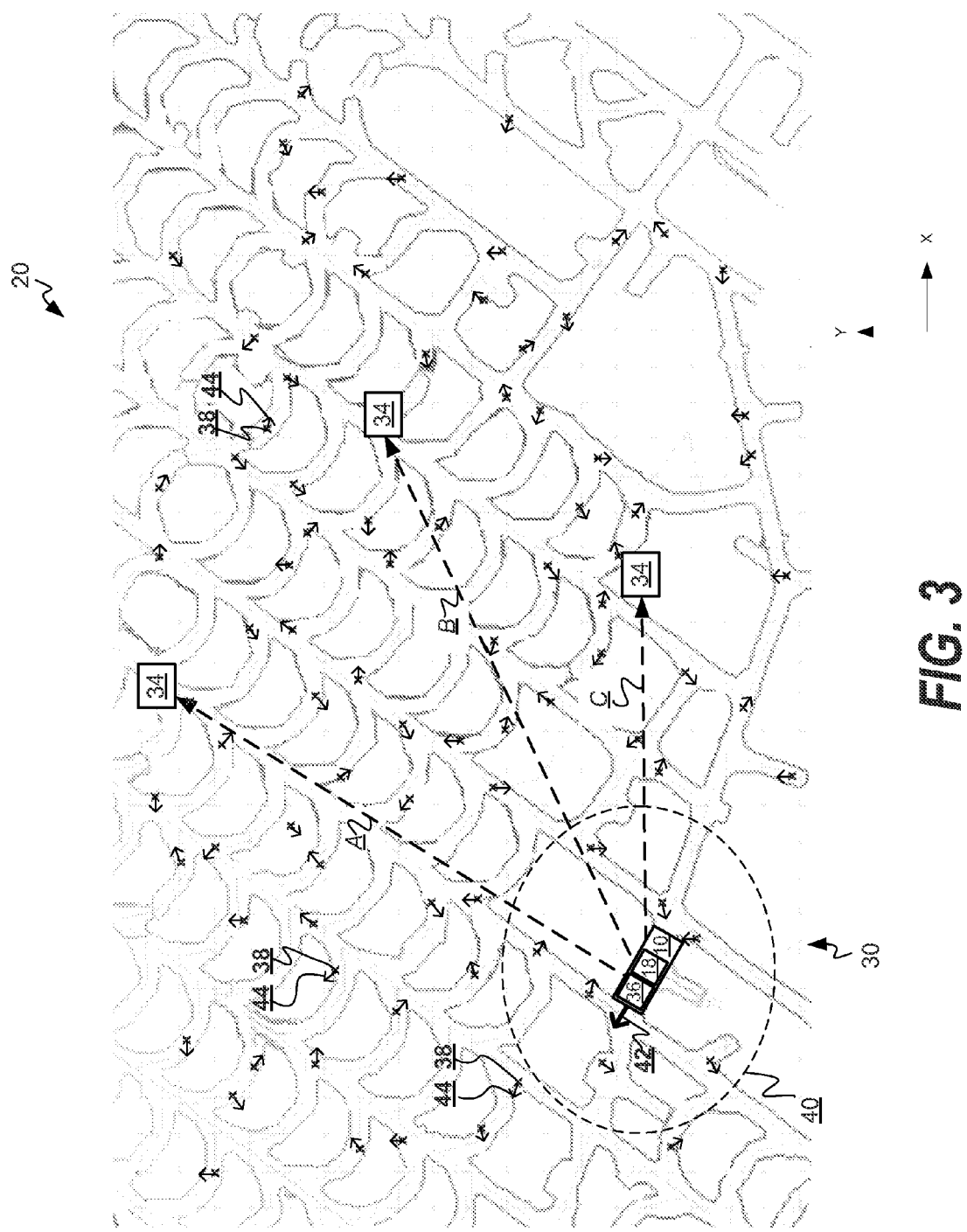
FIG. 3 is a pictorial illustration of another exemplary positioning system that may be used with the machine of FIG. 1.
Figure 4:
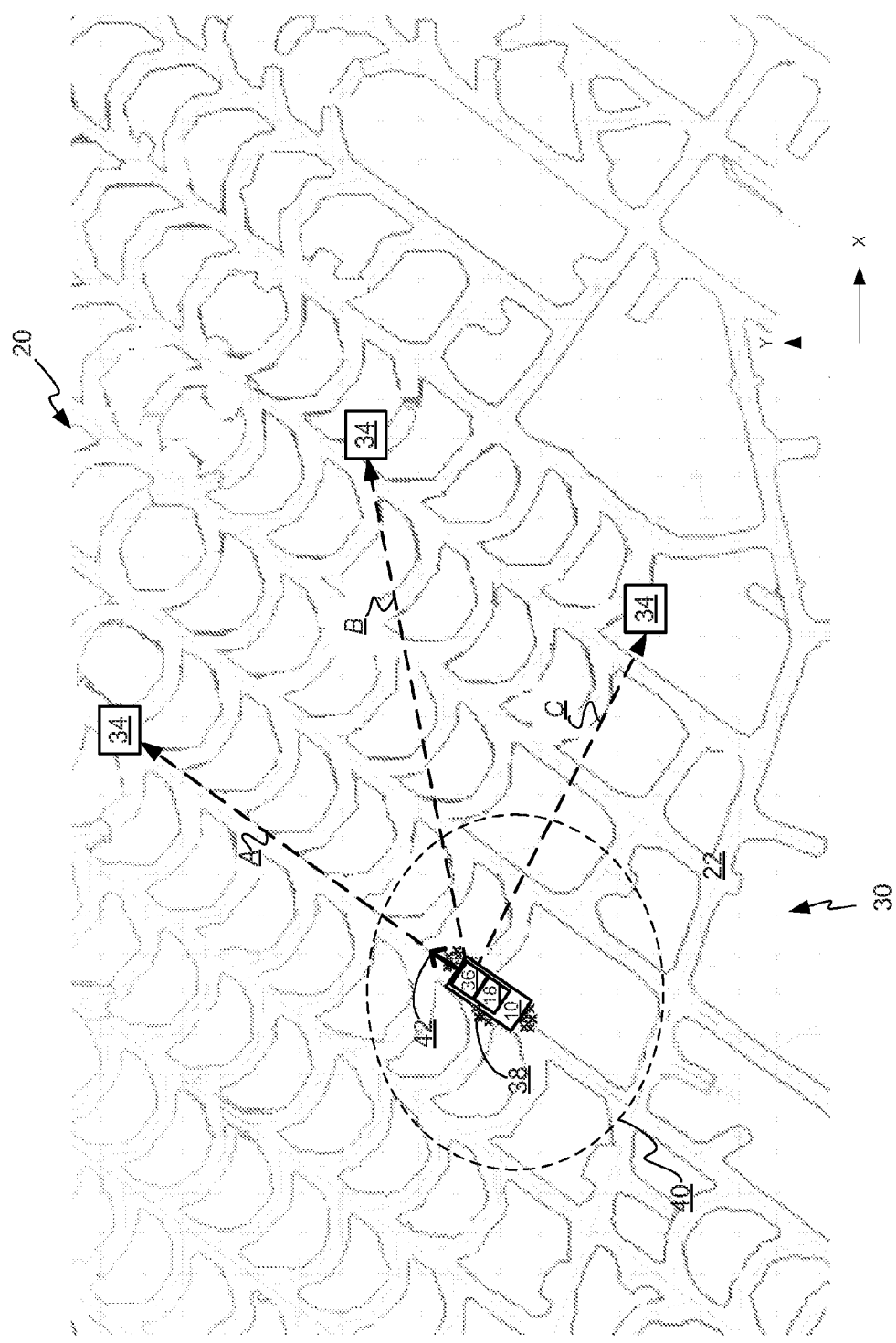
FIG. 4 is a pictorial illustration of a further exemplary positioning system that may be used with the machine of FIG. 1.

As shown in the exemplary worksite 20 of FIGS. 3 and 4, in additional exemplary embodiments, positioning system 30 may include controller 18, reader device 34, and tag device 36, while optical sensing device 32 may be omitted. In FIGS. 3 and 4, machine 10 is shown on roadway 22 of worksite 20 with an orientation heading indicated by an arrow 42. Worksite 20 is also shown to include multiple reader devices 34 at various locations. In the embodiments of FIGS. 3 and 4, positioning system 30 may be configured to determine distances A, B, C between one or more tag devices 36 attached to machine 10 and one or more reader devices 34 attached to various points of worksite 20. Although three reader devices 34 and three distances A, B, C are shown in FIG. 3, various embodiments may have more than three or less than three reader devices 34, and positioning system 30 may be configured to determine more or less than three distances. Positioning system 30 may determine a position of machine 10 based on these distances A, B, C. However, as discussed above, in some environments, errors or noise introduced by reader device 34, tag device 36, or the worksite environment may limit the precision of the distance determination. Due to the limit in precision, positioning system 30 may be able to determine only an approximate position 40 where machine 10 may be.

In addition, in some embodiments, the position of reader devices 34, tag devices 36, and machine 10 may be such that based on the distances A, B, C between reader devices 34 and tag devices 36 with machine 10, positioning system 30 may determine multiple approximate positions 40. For example, if positioning system 30 includes two reader devices 34 attached to two different locations of worksite 20, and machine 10 with tag device 36 is equidistant from both reader devices, according to known geometric principles, there are at least two positions in worksite 20 that machine may be. Therefore positioning system 30 may be unable to determine a unique approximate position 40 that corresponds to the distance information. In such embodiments, a more precise determination of location of machine 10 may be desirable.

Accordingly, in such embodiments, positioning system 30 may perform a simulation utilizing the information from reader device 34 and tag device 36, in an iterative process, to determine a specific position of machine 10 at worksite 20. Such a simulation may include, for example, a particle filter estimation technique and/or other simulation techniques known in the art. As will be described in greater detail below with respect to FIG. 7, such a simulation may include populating a stored map of worksite 20 with one or more particles 38. As shown in FIGS. 3, 4, 8, 9, and 10, such exemplary particles 38 may comprise virtual indicators of possible machine position and/or orientation. For example, such position indicators may comprise an x-coordinate associated with an x-axis and a y-coordinate associated a y-axis. Exemplary x and y axes are shown in FIGS. 3 and 4. In addition, such orientation indicators may comprise degrees of rotation relative to, for example, the positive x-axis, or a two-dimensional unit vector characterized by an x- and y-value. In FIGS. 3 and 4, arrows 44 provide a visual representation of the orientations of particles 38. As will be described in greater detail below, during such a simulation, position system 30 may randomly populate a map stored in the storage module of controller 18 with particles 38, each particle 38 having an initial randomly generated position and orientation 44. The respective positions and/or orientations 44 of the particles 38 may then be updated based on information from reader device 34 and tag device 36, until positioning system 30 is able to determine a specific position of machine 10 indicated by a spatial convergence of the updated particles 38. In some embodiments, a position machine 10 determined in such a manner may be more accurate and/or specific than a position determined based only on a single measurement of distance between reader device 34 and tag device 36.

Figure 5:
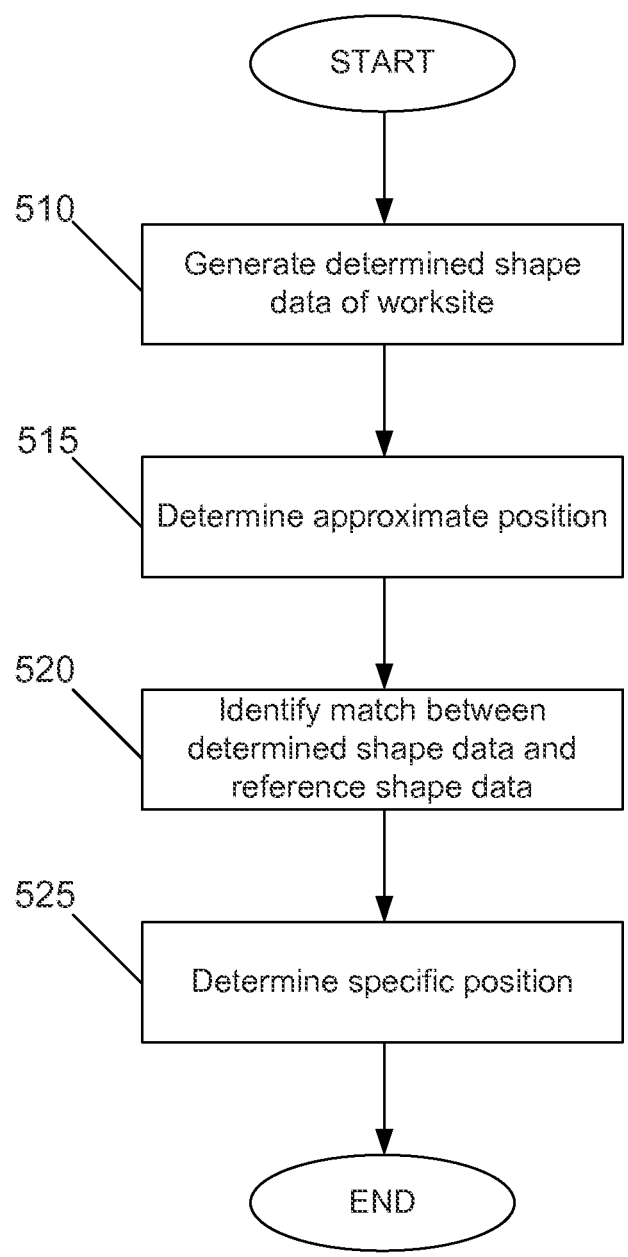
FIG. 5 is a flowchart depicting an exemplary disclosed positioning method.
Figure 6:
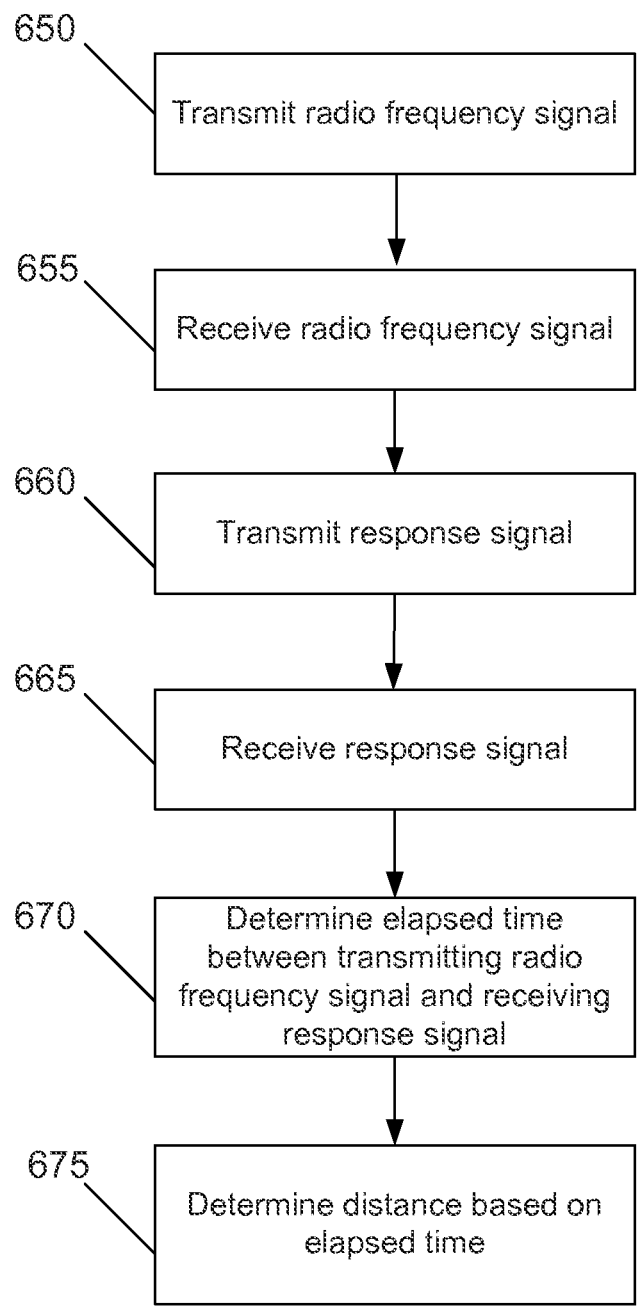
FIG. 6 is a flowchart depicting another exemplary disclosed positioning method.
Figure 7:
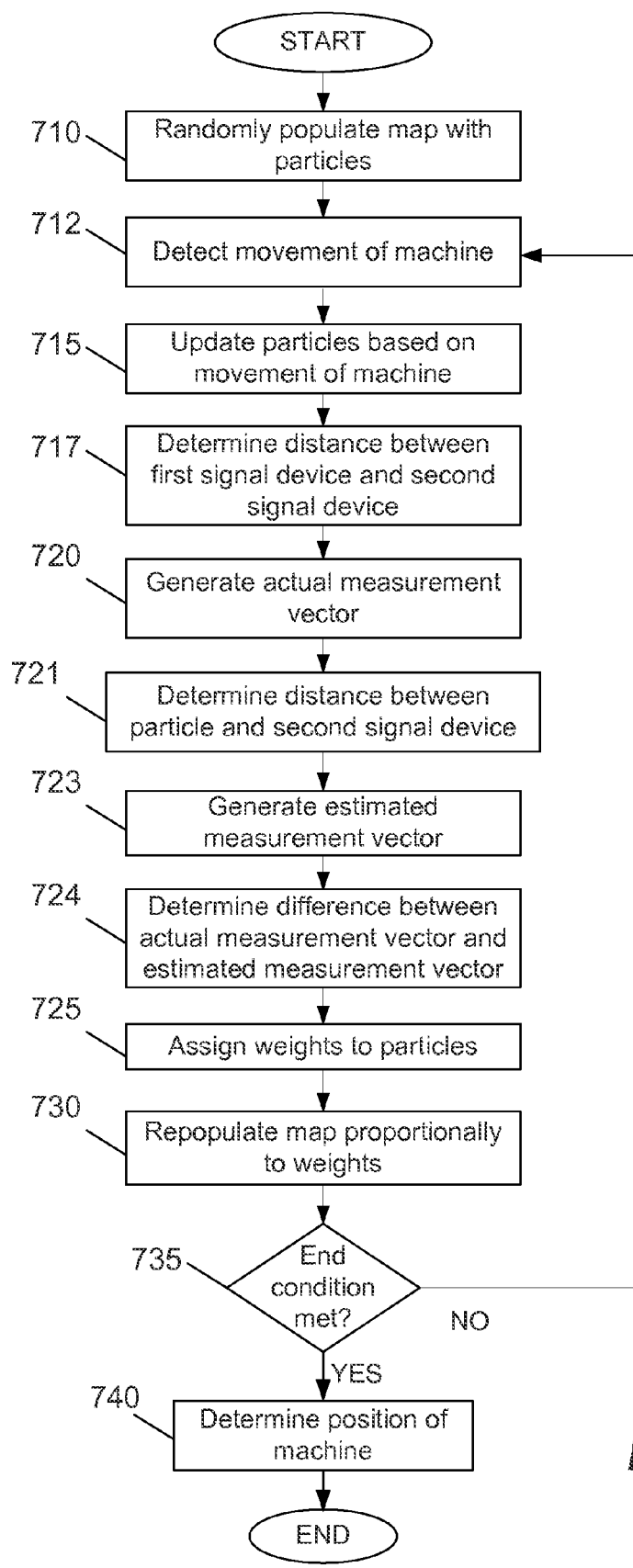
FIG. 7 is a flowchart depicting a further exemplary disclosed positioning method.

FIGS. 5, 6, and 7 illustrate flowcharts associated with exemplary methods of using the various disclosed positioning systems 30, and each of these exemplary methods will be discussed in the following section to further illustrate the disclosed concepts.

Industrial Applicability

The disclosed positioning systems 30 may be applicable to any mobile machine where position determination is desired. The disclosed positioning systems 30 may be particularly applicable to underground mining applications, such as exemplary worksites 20 illustrated in FIGS. 2, 3, and 4, where a machine 10 does not have access to a GPS navigation system.

With reference to the exemplary positioning system 30 in FIG. 2 and the exemplary flow chart shown in FIG. 5, in an exemplary method of determining the position of machine 10, positioning system 30 may begin scanning the roadway 22, side walls 24, or any other part or object associated with worksite 20, with optical sensing unit 32 and may generate determined shape data associated with roadway 22, side walls 24, or other part of worksite 20 (Step: 510). In some embodiments, determined shape data may include, for example, the contour, length, width, height, angle, orientation and/or other shape-indicative information of an object such as side wall 24 in worksite 20. In some embodiments, determined shape data may be in vector format, bitmap format, or any other format known in the art. In some embodiments, determined shape data could include data indicative of a physical feature of objects in worksite 20 other than those listed above, as known in the art, such as for example, texture, complexity, and/or smoothness.

As discussed above, in embodiments when worksite 20 includes surfaces having similar shapes, geometries, and/or other physical attributes at multiple locations, the determined shape data may not provide enough information to determine the specific position of machine 10. Accordingly, at Step 515, positioning system 30 may determine an approximate position 40 of machine 10 using at least one first signal device, such as tag device 36, and at least one second signal device, such as reader device 34. In some embodiments, approximate position 40 may be determined by determining a distance between the first signal device and the second signal device.

FIG. 6 depicts a flowchart illustrating an exemplary method of determining a distance between the first and second signal devices that may be used to determine an approximate position 40 of machine 10 in Step: 515. In the exemplary method illustrated in FIG. 6, the positioning system 30 may use at least one reader device 34 and at least one tag device 36, where either device may be first signal device or second signal device as discussed above. As shown in FIG. 6, at Step 650, a first signal device, such as tag device 36, may generate and transmit a radio frequency signal. In some embodiments, the first signal device may transmit radio frequency signals at predefined regular intervals. In exemplary embodiments, such intervals may be less than or greater than one second. The radio frequency signal may traverse worksite 20 and, at Step 655, the radio frequency signal may be received by a second signal device, such as reader device 34. At Step 660, the second signal device may respond to receiving the radio frequency signal by generating and transmitting a response signal. In some embodiments, the response signal may contain, for example, identification information or coordinate information that is unique to the respective second signal device. The response signal may traverse worksite 20 and, at Step 665, the response signal may be received by the first signal device that transmitted the radio frequency signal. At Step 670, positioning system 30 may determine a time elapsed between the transmission of the radio frequency signal by the first signal device and the reception of the response signal by the first signal device. In other embodiments, positioning system 30 may determine other elapsed times, such as the time elapsed between the transmission of the response signal and reception of the response signal. At Step 675, based on a determined elapsed time and a known radio signal propagation speed, such as, approximately the speed of light, positioning system 30 may determine a distance between the first signal device and the second device signal. For example, positioning system 30 may determine such a distance by multiplying known propagation speed with the time elapsed between transmission and reception of the response signal. This distance may correspond to the distance between, for example, the location of worksite 20 having reader device 34 and the location of machine 10 having tag device 36.

Positioning system 30 may also determine the distance between the location of tag device 36 and a location of more than one reader device 34, in accordance with the method shown in FIG. 6. In such embodiments, positioning system 30 may determine a position of machine 10 based on multiple determined distances, for example, by a trilateration process. However, due to error, noise, and/or other limitations in the precision of the measurement of distance, the determined position may be an approximate position 40. Positioning system 30 may use approximate position 40 to focus a search for a match of determined shape data in map data of worksite 20. By focusing the search to approximate position 40, positioning system 30 may determine a specific position of machine 10, as discussed with respect to Steps: 520 and 525 of FIG. 5.

With continued reference to FIG. 5, at Step 520, positioning system 30 may attempt to find a match between determined shape data generated at step 510, and a reference shape data associated with worksite 20. In some embodiments, positioning system 30 may search a subset of reference shape data from the set of all reference shape data associated with worksite 20 to find the match. For example, positioning system 30 may search a subset of reference shape data that corresponds to portions of side walls 24 that are at approximate position 40 determined at Step 515. Positioning system 30 may identify a match between the determined shape data generated at Step 510 and a reference shape data from the subset of reference shape data associated with approximate position 40. In various embodiments, the match may be made utilizing any number of shape-matching algorithms, image recognition software, and other methods known in the art. At Step 525, positioning system 30 may determine a specific position of machine 10 corresponding to the location of the matching reference shape data.

As discussed above, additional exemplary embodiments for determining the position of machine 10 may not include the use of optical sensing unit 32. In such exemplary embodiments, positioning system 30 may determine the position of machine 10 by performing, for example, a simulation utilizing information from a first signal device, such as tag device 36, and a second signal device, such as reader device 34, in an iterative process, to determine a specific position of machine 10 at worksite 20. FIG. 7 depicts a flowchart illustrating such an exemplary method of determining the specific position of machine 10 that may be used by exemplary positioning systems 30 shown in FIGS. 3 and 4.

In the embodiment of FIG. 7, machine 10 may employ, as depicted in FIGS. 3 and 4, a positioning system 30 that does not include optical sensing unit 32. At Step 710, positioning system 30 may randomly populate a map of worksite 20 with particles 38, as shown in FIG. 3. Such particles 38 may be associated with an estimated position and orientation of machine 10 within worksite 20. When positioning system 30 initially randomly populates the map of worksite 20 with particles 38 at Step: 710, both the position and orientation of each particle 38 may be randomly assigned. In some embodiments, any number of particles 38 may be generated at Step: 710 depending on various factors known in the art, such as computational resources and/or desired convergence. For example, in some embodiments, a number of particles 38 on the order of thousands may be appropriate. In various embodiments, a smaller number of particles 38 may require less computational resources from positioning system 30, but a larger number of particles may allow positioning system 30 to determine the position of machine 10 with fewer iterations before the simulation converges to a solution.

In some embodiments, as positioning system 30 performs the method illustrated in FIG. 7, machine 10 may not maintain the same position and/or orientation 42, but instead, may move within worksite 20. In such embodiments, positioning system 30 may be configured to account for the movement of machine 10. For example, machine 10 may move forward or backward, turn left or right, and/or otherwise change position in any other known manner, and at Step: 712, positioning system 30 may detect such movement of machine 10 using movement sensors 15. At Step: 715, positioning system 30 may then update the positions and/or orientations 44 of particles 38 to reflect movement based on the detected movement of machine 10. For example, if machine 10 moves forward one foot, the current positions of all particles 38 may be moved forward on the map one foot at Step: 715. In exemplary embodiments, an amount of simulated variation may also be introduced at Step: 715 to reflect a limitation in the precision of movement sensors 15. For example, if angular movement measurements from movement sensor 15 are known to be accurate to within five degrees, and machine 10 turns by twenty degrees, particles 38 may on average also turn by twenty degrees. But to account for variations in sensor accuracy, some particles 38 may, for example, turn as much as twenty five or more and others as little as fifteen degrees or less. The distribution of these variations may be determined according to statistical methods known in the art. For example, the percentage of particles 38 that turn by a particular amount of degrees may be set by a Gaussian distribution centered on twenty degrees.

In some embodiments, once positioning system 30 has updated the positions and orientations of particles 38 at Step: 715, positioning system 30 may determine a probability associated with each particle 38 indicating how closely the updated position and orientation 44 of each particle 38 matches the position and orientation 42 of machine 10. For example, in some embodiments, positioning system 30 may determine such a probability for each particle 38 by performing one or more of Steps: 717, 720, 721, 723, 724, and 725 of FIG. 7.

At Step: 717, positioning system 30 may determine the distance between the first signal device, such as tag device 36 on machine 10, and one or more second signal devices, such as reader devices 34 located at various points in worksite 20. The distance may be determined in a manner similar to that discussed with respect to the steps shown in FIG. 6. For example, based on the time elapsed between generation of a radio frequency signal by tag device 36 and reception of a response signal by tag device 36, positioning system 30 may calculate the distance by multiplying the speed of propagation of the radio frequency signal with elapsed time.

Figure 8:
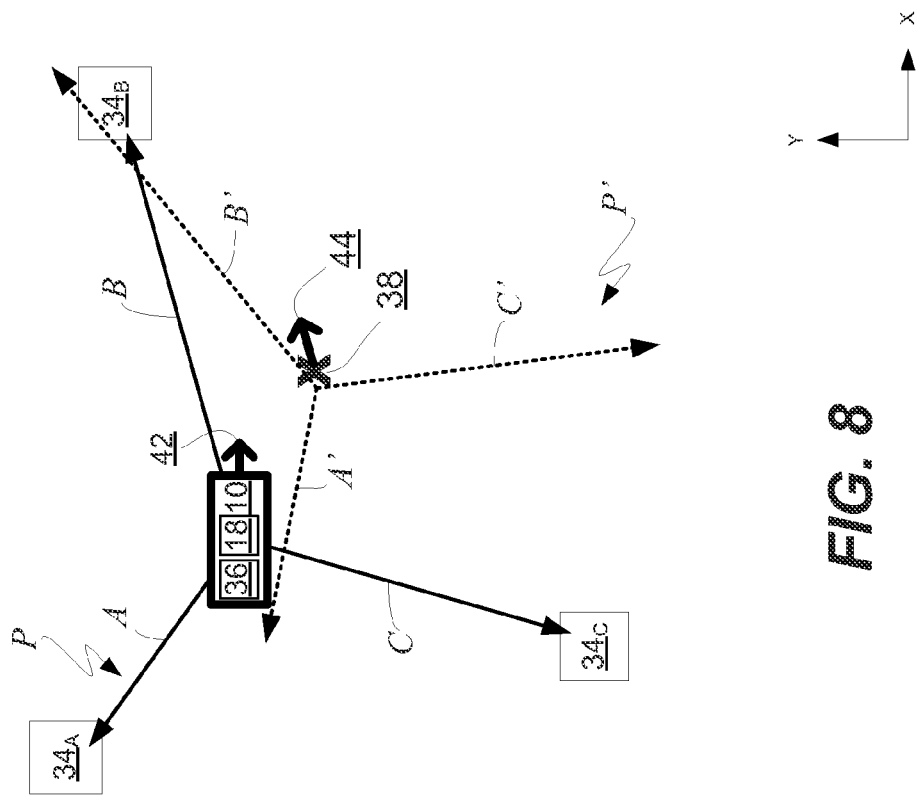
FIG. 8 is a pictorial illustration related to the exemplary method of FIG. 7.

At Step: 720, based on the one or more determined distances from first signal device disposed on machine 10 to the one or more second signal devices located at various points in worksite 20, positioning system 30 may generate an actual measurement vector. Such an actual measurement vector may be based on an actual position of machine 10 at worksite 20 relative to second signal devices, such as reader devices 34 located at various points in worksite 20. The actual measurement vector may include information related to the distances and directions from machine 10 to each reader device 34. FIG. 8 includes a pictorial representation of actual measurement vectors A, B, C extending from tag device 36 to respective reader devices 34$_A$, 34$_B$ and 34$_C$. Actual measurement vectors A, B, C each represent a distance between machine 10 and the respective reader device 34, and a direction from machine 10 to the respective reader device 34. In further exemplary embodiments, actual measurement vectors A, B, C can be collectively referred to as a single and/or composite actual measurement vector P. Such an exemplary vector P is shown in FIG. 8. FIG. 8 also depicts machine 10 with an orientation 42. In addition, a particle 38 is depicted in relation to machine 10, with an orientation 44.

Figure 9:
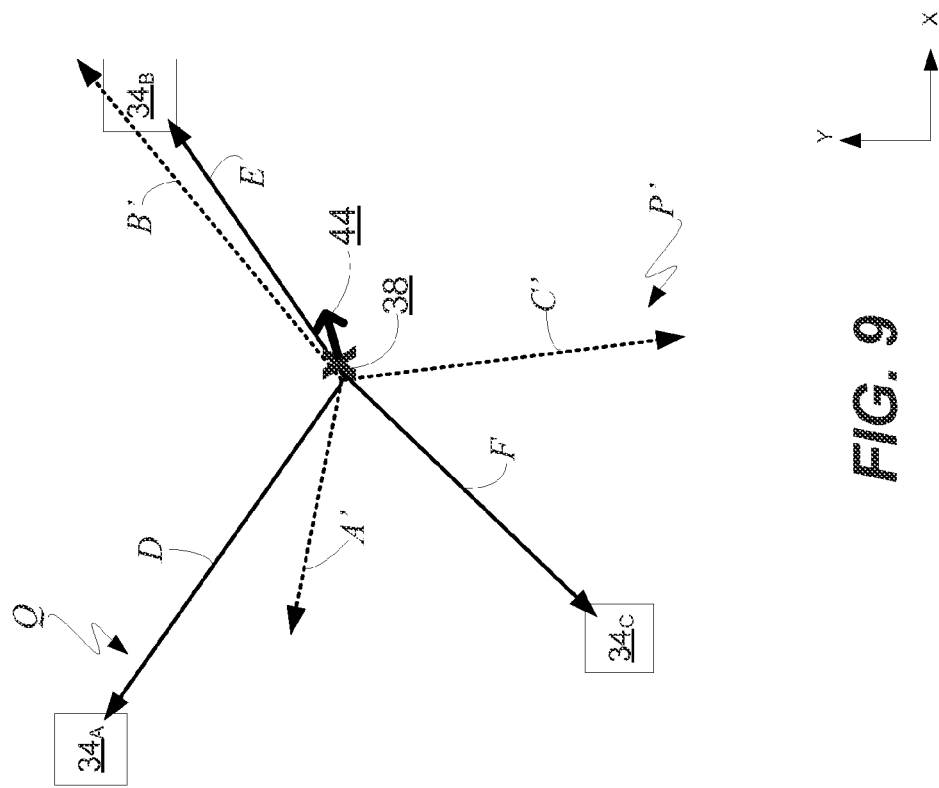
FIG. 9 is another pictorial illustration related to the exemplary method of FIG. 7.

In various embodiments, positioning system 30 may also determine estimated measurement vectors D, E, F based on distances from the estimated position associated with particle 38 to the same reader devices (34$_A$, 34$_B$, 34$_C$) used to generate actual measurement vector P. FIG. 9 includes a pictorial representation of estimated measurement vectors D, E, F extending from particle 38 to respective reader device 34$_A$, 34$_B$, and 34$_C$. Estimated measurement vectors D, E, F each represent a distance between particle 38 and the respective reader device 34, and a direction from particle 38 to the respective reader device 34. In further exemplary embodiments, estimated measurement vectors D, E, F can be collectively referred to as a single and/or composite estimated measurement vector Q. Such an exemplary vector Q is shown in FIG. 8. FIG. 9 corresponds to FIG. 8 in that it depicts particle 38 with the same position and orientation 44 relative to reader devices 34 as depicted in FIG. 8. However, machine 10 has been omitted from FIG. 9 for clarity. Estimated measurement vector Q is indicative of the estimated position and orientation 44 of particle 38 relative to reader devices 34$_A$, 34$_B$, and 34$_C$. In some embodiments, positioning system 30 may, at Step 721, determine the distances between the estimated position of particle 38 and the positions of the same set of reader devices 34 used to generate actual measurement vector P at Step 720 in order to determine estimated measurement vector Q. For example, positioning system 30 may determine each distance by calculating the difference between known positions of respective reader devices 34$_A$, 34$_B$, 34$_C$ and the estimated position of particle 38.

As shown in FIGS. 8 and 9, in exemplary embodiments, actual measurement vector P and estimated measurement vector Q may not match each other due to differences in the positions and orientations of machine 10 and particle 38, respectively. Accordingly, at Step: 724, positioning system 30 may determine a difference between actual measurement vector P and estimated measurement vector Q. In the exemplary embodiments shown in FIG. 8 and FIG. 9, positioning system 30 may determine the difference between actual measurement vector P and estimated measurement vector Q by translating and rotating one or both of the two measurement vectors P and Q relative to each other in a single reference frame. For example, at Step: 724, actual measurement vector P may be translated to be centered on particle 38, as shown by measurement vector P' in FIG. 8. Furthermore, in FIG. 8, measurement vector P', as centered on particle 38, is also rotated relative to orientation 44 of particle 38 by the amount of rotational difference between orientation 44 of particle 38 and orientation 42 of machine 10. Translated and/or rotated measurement vector P' includes components A', B', and C' that correspond to components A, B, and C of actual measurement vector P respectively. As an example, if particle 38 is oriented 15 degrees counterclockwise relative to machine 10, translated and/or rotated measurement vector P' may also be rotated 15 degrees counterclockwise relative to actual measurement vector P. Once positioning system 30 has translated and/or rotated actual measurement vector P, positioning system 30 may compare translated measurement and/or rotated vector P' to estimated measurement vector Q, both depicted in FIG. 9. For example, position system 30 may determine a vector difference between translated and/or rotated measurement vector P' and estimated measurement vector Q. For example, such a vector difference may be calculated by individually calculating the vector difference between each component A' and A, B' and B, and C' and C. A vector difference may be calculated by taking the difference between each element in one vector, such as A', and the corresponding element in the other vector, such as A. In some embodiments, positioning system 30 may also calculate the magnitude of the vector difference between vectors P' and Q to determine the difference between actual measurement vector P of machine 10 and estimated measurement vector Q of particle 38. At Step: 724, positioning system 30 may determine the difference between actual measurement vector P and estimated measurement vector Q, for example, by determining the difference between measurement vectors P' and Q, for each of particles 38 with which positioning 30 has populated map of worksite 20.

At Step: 725, positioning system 30 may assign weights to each particle 38 based on the difference. For example, if the difference between actual measurement vector P and estimated measurement vector Q for a specific particle 38 is smaller than for other particles 38, this may be an indication of higher probability that the position and orientation of the specific particle 38 is an accurate estimate of the position and orientation of machine 10. If the difference between the actual measurement vector P and the estimated measurement vector Q for a specific particle 38 is larger than for other particles 38, this may be an indication of lower probability that the position and orientation of the specific particle 38 is an accurate estimate of the position and orientation of machine 10. Therefore, in some embodiments, at Step 725, positioning system 30 may assign, from a configurable range of weights, a larger weight indicating higher probability to a particle 38 whose corresponding estimated measurement vector Q has a smaller vector difference with the actual measurement vector P compared with the vector difference between the actual measurement vector P and the estimated measurement vector Q corresponding to other particles 38. Positioning system 30 may assign a smaller weight indicating lower probability to a particle 38 whose corresponding estimated measurement vector Q has a larger vector difference with the actual measurement vector P compared with the vector difference between the actual measurement vector P and the estimated measurement vector Q corresponding to other particles 38.

Figure 10:
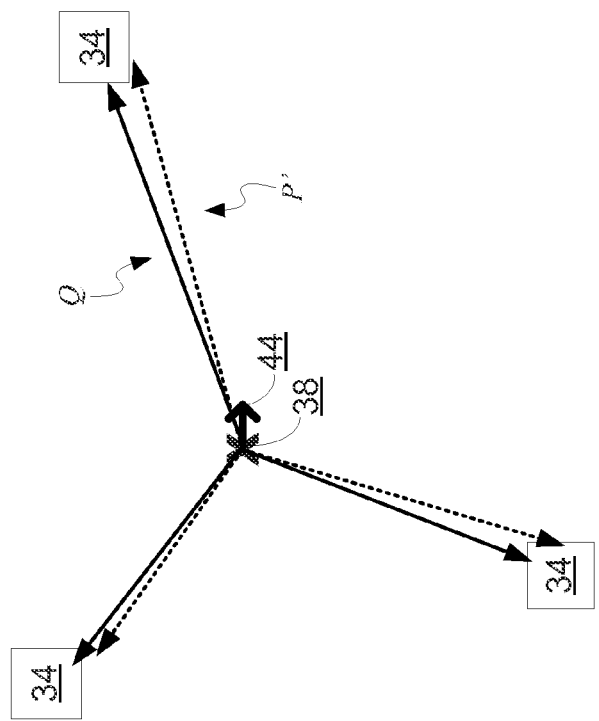
FIG. 10 is a further pictorial illustration related to the exemplary method of FIG. 7.
Figure 10:
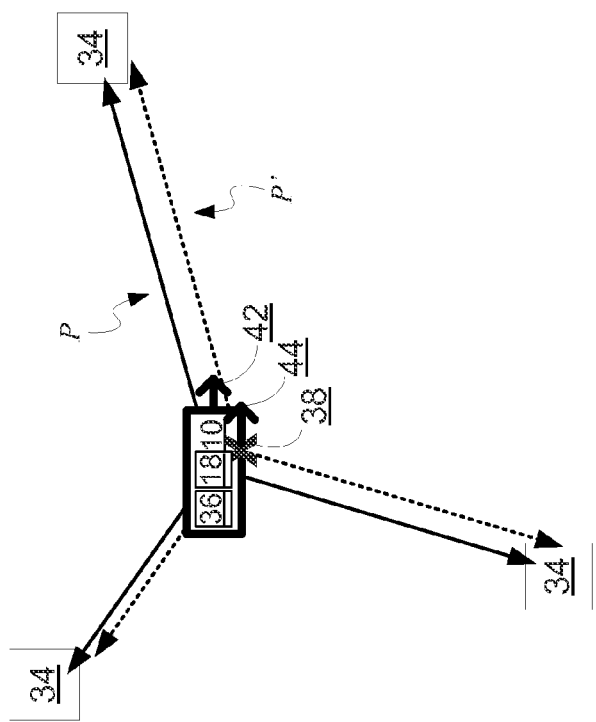

For example, with reference to FIG. 8 and FIG. 9, at Step: 725, positioning system 30 may assign a particular weight to particle 38 based on the difference between actual measurement vector P and estimated measurement vector Q, determined at Step: 724. FIG. 10, on the other hand, shows a different particle 38 having a position and orientation 44 that more closely matches the position and orientation 42 of machine 10. In such an embodiment, positioning system 30 may assign a relatively higher weight to the particle 38 of FIG. 10 than the weight assigned to particle 38 depicted in FIGS. 8. and 9 since the difference between actual measurement vector P and estimated measurement vector Q, in FIG. 10, is smaller. In further embodiments, it is contemplated that other methods known in the art may be used to determine a weight for each particle 38.

At Step: 730 of FIG. 7, positioning system 30 may repopulate the map with a new set of particles 38. In various embodiments, the map may be repopulated by reproducing or keeping some or all of the previous set of particles 38. In some embodiments, which particles 38 that are kept, and how many of the particles are kept, may be selected randomly, but the probability of selection may be proportional to the weight assigned to each particle 38 at Step: 725. Additionally, the rate of reuse of a particular particle 38 may in some embodiments be proportional to the weight assigned to that particle 38. Particles 38 with higher weights may be randomly chosen multiple times in proportion to the weight. Particles 38 with lower weights may be randomly chosen less frequently or not at all. In such embodiments, positioning system 30 may resample the previous set of particles 38, reusing particles 38 from the previous set one or more times to be in the new set. For example, a previous set of particles 38 may contain 100 particles, and each particle 38 is assigned a weight at Step: 725. Positioning system 30 may generate the first particle 38 in the next set of particles 38 by randomly selecting a particle 38 from the previous set of particles 38, with a higher likelihood of choosing particle 38 with a larger weight. This random selection that incorporates the increased likelihood of selection for different particles 38 may be implemented in various ways known in the art. For example, before positioning system 30 begins the random selection process, positioning system 30 may create a representative pool of particles 38 to make the selection from. The representative pool may include all of the particles 38 from the previous set, but may also include multiples of some or all of the particles 38 in proportion to the weight of each particle 38. In such an example, a particle 38 with a larger weight may be represented more times than a particle 38 with a smaller weight in the representative pool of particles 38. Therefore, when positioning system 30 randomly selects from the representative pool of particles 38, positioning system 30 may be more likely to select particles 38 that make up a larger percentage of the representative pool than particles 38 that make up a smaller percentage of the representative pool. Positioning system 30 may then continue to generate all other particles 38 in the next set of particles 38 by again randomly selecting from, for example, the same representative pool of particles. Any other mode of representation of particles 38 that incorporates information of the weights of particles 38 may be used as well.

As a result of Step: 730, the next set of particles 38 may include more particles 38 clustering around positions that are more likely to have the same position of machine 10, and more particles 38 with orientations 44 that are more likely the same as the orientation 42 of machine 10. Positioning system 30 may then repeat Steps: 715 to 730 using the new set of particles 38. Positioning system 30 may continue to repeat Steps: 715 to 730, in a closed-loop manner. In various embodiments, after multiple iterations, a majority of particles 38 may be positioned close to the actual position of machine 10, as shown in FIG. 4. A majority of particles 38 may also have orientations 44 that are close to the orientation 42 of machine 10 (not shown). In FIG. 4, machine 10 is depicted as having moved during the time the iterations occurred, illustrating that exemplary methods performed by positioning system 30 may occur in dynamic situations. In such situations, particles 38 may be updated to become more accurate estimates of machine 10, and particles 38 may also be updated to reflect the changes in the position and orientation 42 of machine 10 that is moving. Eventually, particles 38 may converge upon the position and orientation 42 of machine 10 despite the fact that machine 10 may be constantly moving.

At Step: 735, at the end of each iteration, positioning system 30 may determine whether an end condition has been met. Such determinations at Step: 735 may include, for example, checking to see if a quantitative spread of particles 38 is above or below a threshold or determining whether a predetermined number of iterations have been performed. In exemplary embodiments, the quantitative spread may be a value which indicates a variation in the values of position and/or orientation of particles 38, such as standard deviation, statistical range, and/or any other measure known in the art. If the end condition has not been met (Step 735:NO), positioning system 30 may return to Step 715 and may continue to perform Steps 715 to 730. When the end condition is met (Step 735:YES), positioning system 30 may calculate and/or otherwise determine the position of machine 10 at Step: 740. For example, positioning system 30 may average the positions of particles 38 to generate a best estimate of the specific position of machine 10. It is contemplated that the best estimate of the specific position of machine 10 may be determined from the particles using other calculations known in the art. In some embodiments, positioning system 30 may also determine a quantitative spread of the position and/or orientation 44 of particles 38 to determine an accuracy of the estimate. For example, if the particles are loosely spread out in position, there is less certainty in the accuracy of the estimate than an estimate based on tightly clustered particles. For example, if the greatest distance between any two particles is less than a configurable threshold value, such as 75 meters, positioning system 30 may determine that the accuracy of the estimate is accurate. In such an example, the threshold value may be set to other appropriate values. In various embodiments, positioning system 30 may be a continuous real-time tracking system, and therefore, even after an end condition has been met at Step: 735 and the position of machine 10 has been determined, as long as machine 10 continues to move, particles 38 may continue to be updated. That is, positioning system 30 may continue to perform Steps: 715 to 730 even after determination of the position of machine 10, in order to maintain an accurate, updated determination of the position of machine 10, as machine 10 continues to move.

In various embodiments, at any given moment, machine 10 and first signal device, such as tag device 36, may be within a physical range that allows for communication with a subset of all of second signal device, such as reader devices 34, in worksite 20. The method described in FIG. 6 may include the subset of all second signal devices in worksite 20 that are in the physical range that allows for communication with first signal device. As the method in FIG. 7 proceeds through iterations, machine 10 may move such that some of the reader devices 34 that were originally in communication range are no longer in range, and those that were not in range are now in range. In various embodiments, each iteration can be adjusted to use signals received from any/all second signal devices that are currently in communication range.

Several benefits may be associated with the embodiments of disclosed positioning system. For example, because determination of position of machine 10 does not rely on LIDAR, mud and other artifacts from worksite 20 obstructing the source of light beam signals may not hinder determination of the position of machine 10. Yet, despite the lack of LIDAR, high precision determination of the position of machine 10 may be possible utilizing radio frequency signals.

It will be apparent to those skilled in the art that various modifications and variations can be made to the positioning system 30 of the present disclosure. For example, in some embodiments, it is contemplated that the number of first or second signal devices may be optimized for a specific level of precision of position determination. In other embodiments, the number of first or second signal devices may be optimized for minimization and simplification of the number of components in positioning system. In some embodiments, controller 18 may be located somewhere other than machine 10, or there may be multiple controllers 18 at various locations. For example, controller 18 may be part of a computer system that is associated with worksite 20, or may be part of a remote system. In some embodiments, any component of the positioning system may be in communication with any other component of the positioning system by wired or wireless connections. Other embodiments of the method and system will be apparent to those skilled in the art from consideration of the specification and practice of the positioning system disclosed herein. It is intended that the specification and examples be considered as exemplary only, with a true scope of the disclosure being indicated by the following claims and their equivalents.

What is claimed is:

1. A system for determining a position of a machine at a worksite, comprising:
   a first signal device configured to transmit one or more radio frequency signals and receive one or more response signals;
   a second signal device configured to receive the one or more transmitted radio frequency signals and transmit the one or more response signals in response to receiving the one or more radio frequency signals,
   wherein the first signal device is located on one of the machine and at a fixed location within the worksite, and the second signal device is located at the other of on the machine and the fixed location within the worksite;
   a movement sensor configured to detect movement of the machine; and
   a controller configured to:
   generate a plurality of first sets of particles and second sets of particles in a closed-loop manner by:
   (a) generating a first set of particles, each particle in the first set being associated with a position within the worksite and an orientation,
   (b) updating the position and orientation of each particle of the first set of particles based on the detected movement of the machine,
   (c) assigning a weight to each particle of the first set of particles indicative of a probability that the position and orientation of the respective particle match the position and an orientation of the machine, wherein the probability is determined based on elapsed time between transmitting the one or more radio frequency signals and receiving the one or more response signals, and
   (d) generating a second set of particles based on the assigned weights; and
   determine the position of the machine based on one of the plurality of second sets of particles.

2. The system of claim 1, wherein assigning the weight to each particle comprises:
   generating an actual measurement vector indicative of a position of the machine relative to the first signal device, wherein
   the first signal device is located at the fixed location and the position of the machine relative to the first signal device is determined by a distance calculated based on an elapsed time between transmission of the one or more radio frequency signals and reception of the one or more response signals,
   generating a predicted measurement vector indicative of the position of each particle of the current set of particles relative to the first signal device, and
   assigning the weight to each particle based on a difference between the actual measurement vector and the predicted measurement vector.

3. The system of claim 1, wherein generating the second set of particles by utilizing the assigned weights comprises reproducing particles from the first set of particles, wherein particles in the first set are reproduced one or more times in proportion to their assigned weights.

4. The system of claim 1, wherein the first signal device is an RFID tag device and the radio frequency signal includes unique identification information associated with the RFID tag device, and the second signal device is an RFID reader device and the response signal includes unique identification information associated with the RFID reader device.

5. The system of claim 1, wherein the first signal device is located at a fixed location within the worksite, and the second signal device is located on the machine and is in communication with the controller.

6. The system of claim 5, wherein
   the first signal device determines a distance between the first signal device and the second signal device, and
   the second signal device retrieves the determined distance from the first signal device and transmits the determined distance to the controller.

7. The system of claim 1, wherein the second signal device is located at a fixed location within the worksite, and the first signal device is located on the machine and is in communication with the controller.

8. A method for determining a position of a machine in a worksite, performed by one or more computing processors, comprising:
   transmitting one or more radio frequency signals from a first signal device;
   receiving the one or more radio frequency signals by a second signal device;
   transmitting one or more response signals from the second signal device in response to receiving the one or more radio frequency signals;
   receiving the one or more response signals by the first signal device;
   generating, by the one or more computing processors, a plurality of first sets of particles and second sets of particles, in a closed-loop manner by:
   (a) generating a first set of particles, each particle being associated with a position within the worksite and an orientation,
   (b) updating the position and orientation of each particle of the first set of particles based on detected movement of the machine, (c) assigning a weight to each particle of the first set of particles indicative of the probability that the position and orientation of the particle match the position and an orientation of the machine, wherein the probability is determined based on elapsed times between transmission of the one or more radio frequency signals and reception of the one or more response signals, and (d) generating a second set of particles based on the assigned weights; and determining, by the one or more computing processors, the position of the machine based on one of the plurality of second sets of particles.

9. The method of claim 8, wherein assigning the weight to each particle comprises:

generating an actual measurement vector indicative of a position of the machine relative to a first signal device located at a fixed location within the worksite, wherein the position of the machine relative the first signal device is determined by a distance calculated based on an elapsed time between transmission of the one or more radio frequency signals and reception of the one or more response signals;

generating a predicted measurement vector indicative of a position of each particle of the current set of particles relative to the first signal device;

assigning the weight to each particle based on a difference between the actual measurement vector and the predicted measurement vector.

10. The method of claim 9, wherein generating the second set of particles by utilizing the assigned weights comprises reproducing particles from the first set of particles in the second set of particles, wherein particles in the first set of particles are reproduced in proportion to their assigned weights.

11. A load-haul-dump loader in a worksite, comprising:
a power system;
one or more traction devices driven by the power system to move the load-haul- dump-loader; and
a system to determine the position of the load-haul-dump loader comprising:
a first signal device;
a second signal device;
a movement sensor; and
a controller configured to:
generate a plurality of first sets of particles and second sets of particles in a closed-loop manner by:

(a) generating a first set of particles, each particle being associated with a position within the worksite and an orientation, (b) updating the position and orientation of each particle of the first set of particles based on detected movement of the load-haul-dump loader, (c) assigning a weight to each particle of the first set of particles indicative of the probability that the position and orientation of the respective particle match the position and an orientation of the load-haul-dump loader, wherein the probability is determined based on elapsed time between transmitting one or more frequency signals by the first signal device and receiving the one or more response signals by the second signal device, and (d) generating a second set of particles by utilizing the assigned weights, and determine the position of the load-haul-dump loader based on one of the plurality of second sets of particles.

* * * * *

UNITED STATES PATENT AND TRADEMARK OFFICE
CERTIFICATE OF CORRECTION

PATENT NO. : 8,965,641 B2
APPLICATION NO. : 13/722179
DATED : February 24, 2015
INVENTOR(S) : Smith et al.

It is certified that error appears in the above-identified patent and that said Letters Patent is hereby corrected as shown below:

In the specification

Column 10, line 13, delete "Industrial Applicability" and insert -- INDUSTRIAL APPLICABILITY --.

Signed and Sealed this
Twenty-ninth Day of December, 2015

Michelle K. Lee
*Director of the United States Patent and Trademark Office*